United States Patent
Yabuzaki et al.

(10) Patent No.: US 8,133,837 B2
(45) Date of Patent: Mar. 13, 2012

(54) EXHAUST GAS-PURIFYING CATALYST

(75) Inventors: Yuji Yabuzaki, Kakegawa (JP); Akimasa Hirai, Kakegawa (JP); Kenichi Taki, Kakegawa (JP)

(73) Assignee: Cataler Corporation, Shizuoka (JP)

( * ) Notice: Subject to any disclaimer, the term of this patent is extended or adjusted under 35 U.S.C. 154(b) by 0 days.

(21) Appl. No.: 12/402,419

(22) Filed: Mar. 11, 2009

(65) Prior Publication Data
US 2009/0181847 A1 Jul. 16, 2009

Related U.S. Application Data

(63) Continuation of application No. PCT/JP2007/070048, filed on Oct. 15, 2007.

(30) Foreign Application Priority Data

Oct. 30, 2006 (JP) .................................. 2006-294913

(51) Int. Cl.
*B01J 23/00* (2006.01)
*B01J 21/00* (2006.01)
*B01J 20/00* (2006.01)

(52) U.S. Cl. ........ 502/327; 502/252; 502/261; 502/262; 502/326; 502/328; 502/332; 502/333; 502/334; 502/339; 502/340; 502/341; 502/349; 502/350; 502/527.12; 502/527.13

(58) Field of Classification Search .................. 502/240, 502/262, 327, 332–334, 339, 349, 350, 355, 502/415, 439, 527.12, 527.13, 261, 326, 502/328, 340, 341, 252
See application file for complete search history.

(56) References Cited

U.S. PATENT DOCUMENTS

| | | | | | |
|---|---|---|---|---|---|
| 5,494,878 A | * | 2/1996 | Murakami et al. | ............ | 502/304 |
| 5,525,307 A | * | 6/1996 | Yasaki et al. | .................. | 422/171 |
| 5,597,771 A | * | 1/1997 | Hu et al. | ........................ | 502/304 |
| 5,795,840 A | * | 8/1998 | Takami et al. | ................ | 502/327 |
| 5,948,377 A | * | 9/1999 | Sung | .......................... | 423/213.5 |
| 6,087,295 A | * | 7/2000 | Kharas et al. | ................. | 502/300 |
| 6,087,298 A | * | 7/2000 | Sung et al. | .................... | 502/333 |
| 6,165,429 A | * | 12/2000 | Ikeda et al. | ................ | 423/213.5 |

(Continued)

FOREIGN PATENT DOCUMENTS

JP 60-17239 2/1985

(Continued)

OTHER PUBLICATIONS

International Preliminary Report on Patentability issued May 5, 2009, for PCT Application No. PCT/JP2007/070048, English Translation, 12 pages.

(Continued)

*Primary Examiner* — Cam N Nguyen
(74) *Attorney, Agent, or Firm* — John P. White; Cooper & Dunham LLP

(57) ABSTRACT

Decreasing HC emission is made possible. An exhaust gas-purifying catalyst includes a substrate, a hydrocarbon-adsorbing layer covering the substrate, and a catalytic layer covering the hydrocarbon-adsorbing layer. The catalytic layer includes a layered structure of a first catalytic layer including a precious metal and a carrier supporting it, and a second catalytic layer including the same precious metal as the precious metal of the first catalytic layer and a carrier supporting it and having a concentration of the precious metal higher than that in the first catalytic layer.

17 Claims, 2 Drawing Sheets

U.S. PATENT DOCUMENTS

| | | | |
|---|---|---|---|
| 6,191,061 B1* | 2/2001 | Takada et al. | 502/66 |
| 6,294,140 B1* | 9/2001 | Mussmann et al. | 423/213.5 |
| 6,375,910 B1 | 4/2002 | Deeba et al. | |
| 6,444,610 B1* | 9/2002 | Yamamoto | 502/325 |
| 6,500,392 B2* | 12/2002 | Mizuno et al. | 422/177 |
| 6,514,905 B1* | 2/2003 | Hanaki et al. | 502/328 |
| 6,518,213 B1* | 2/2003 | Yamamoto et al. | 502/65 |
| 6,589,901 B2* | 7/2003 | Yamamoto et al. | 502/65 |
| 6,750,168 B2* | 6/2004 | Yan et al. | 502/79 |
| 6,756,336 B2* | 6/2004 | Kasahara et al. | 502/65 |
| 6,764,665 B2 | 7/2004 | Deeba et al. | |
| 6,767,855 B2* | 7/2004 | Kasahara et al. | 502/66 |
| 6,790,808 B2* | 9/2004 | Tanada et al. | 502/344 |
| 6,794,330 B2* | 9/2004 | Tanada et al. | 502/261 |
| 6,893,997 B2* | 5/2005 | Matsumoto et al. | 502/326 |
| 6,967,186 B2* | 11/2005 | Takaya et al. | 502/325 |
| 7,084,086 B2* | 8/2006 | Kasahara et al. | 502/60 |
| 7,112,550 B2* | 9/2006 | Hiramoto et al. | 502/64 |
| 7,265,073 B2* | 9/2007 | Yoshikawa | 502/66 |
| 7,276,212 B2* | 10/2007 | Hu et al. | 422/177 |
| 7,374,729 B2* | 5/2008 | Chen et al. | 422/177 |
| 7,517,510 B2* | 4/2009 | Chen et al. | 423/213.2 |
| 7,550,124 B2* | 6/2009 | Chen et al. | 423/213.2 |
| 7,576,028 B2* | 8/2009 | Noda et al. | 502/202 |
| 7,576,031 B2* | 8/2009 | Beutel et al. | 502/339 |
| 7,727,923 B2* | 6/2010 | Nakano et al. | 502/60 |
| 2001/0006934 A1 | 7/2001 | Kachi et al. | |
| 2002/0048542 A1* | 4/2002 | Deeba et al. | 423/239.1 |
| 2003/0061860 A1 | 4/2003 | Hu et al. | |
| 2003/0103886 A1* | 6/2003 | Dou | 423/239.1 |
| 2004/0063577 A1* | 4/2004 | Wieland et al. | 502/339 |
| 2004/0198595 A1* | 10/2004 | Chen | 502/328 |
| 2005/0164879 A1* | 7/2005 | Chen | 502/328 |
| 2005/0227867 A1 | 10/2005 | Chen et al. | |
| 2005/0282701 A1* | 12/2005 | Foong et al. | 502/304 |

FOREIGN PATENT DOCUMENTS

| | | |
|---|---|---|
| JP | 1-281144 | 11/1989 |
| JP | 08-010566 | 1/1996 |
| JP | 9-155192 | 6/1997 |
| JP | 9-221304 | 8/1997 |
| JP | 10-174866 | 6/1998 |
| JP | 11-070332 | 3/1999 |
| JP | 11-210451 | 8/1999 |
| JP | 2000-042368 | 2/2000 |
| JP | 2001-079402 | 3/2001 |
| JP | 2001-182527 | 7/2001 |
| JP | 2001-212464 | 8/2001 |
| JP | 2002-320856 | 11/2002 |
| JP | 2002-540916 | 12/2002 |
| JP | 2003-220339 | 8/2003 |
| JP | 2004-097902 | 4/2004 |
| JP | 2004-181430 | 7/2004 |
| JP | 2004-321894 | 11/2004 |
| JP | 2006-167540 | 6/2008 |

OTHER PUBLICATIONS

Non-Final Office Action from U.S. Appl. No. 12/426,050, mailed on Aug. 13, 2009.

Final Office Action from U.S. Appl. No. 12/426,050, mailed on Apr. 27, 2010.

First Notification of Examination Opinion mailed Dec. 23, 2010, for CN Patent Application No. 200780036654.8, with English Translation, 12 pages.

* cited by examiner

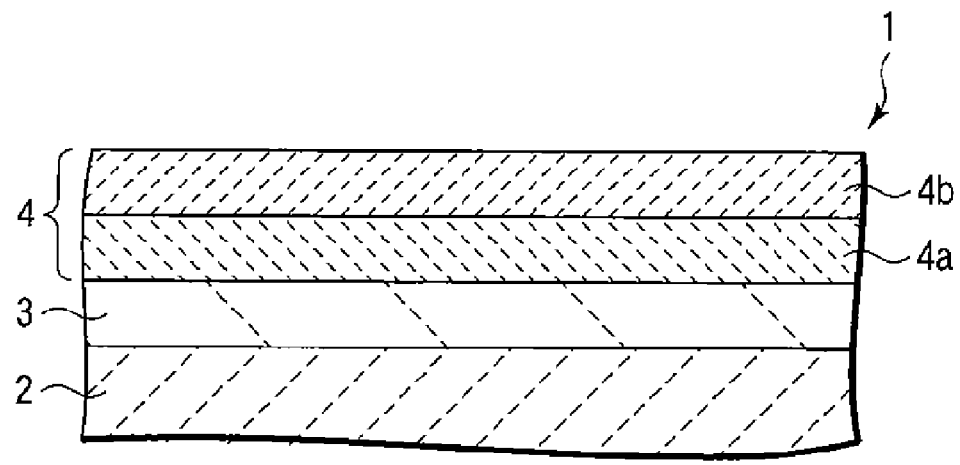
F I G. 3
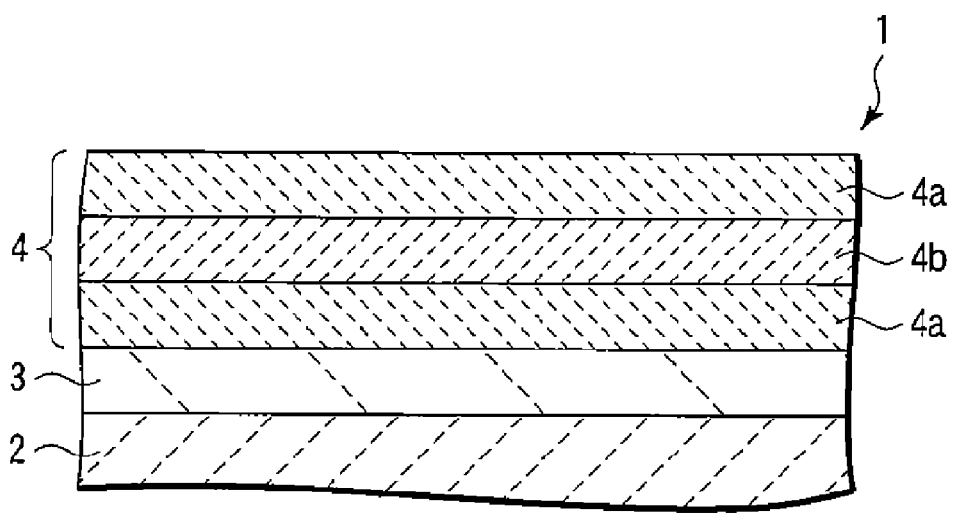
F I G. 4

EXHAUST GAS-PURIFYING CATALYST

CROSS REFERENCE TO RELATED APPLICATIONS

This is a Continuation Application of PCT Application No. PCT/JP2007/070048, filed Oct. 15, 2007, which was published under PCT Article 21 (2) in Japanese.

This application is based upon and claims the benefit of priority from prior Japanese Patent Application No. 2006-294913, filed Oct. 30, 2006, the entire contents of which are incorporated herein by reference.

BACKGROUND OF THE INVENTION

1. Field of the Invention

The present invention relates to an exhaust gas-purifying catalyst, in particular, to an exhaust gas-purifying catalyst including hydrocarbon-adsorbing material.

2. Description of the Related Art

Until today, as an exhaust-gas purifying catalyst for treating an exhaust gas from an automobile, etc., used widely is a three-way catalyst in which a refractory carrier made of an inorganic oxide such as alumina supports a precious metal. In the three-way catalyst, the precious metal plays the role in promoting the reduction of nitrogen oxides ($NO_x$) and the oxidations of carbon monoxide (CO) and hydrocarbons (HC). Further, the refractory carrier plays the roles in increasing the specific surface area of the precious metal and suppressing the sintering of the precious metal by dissipating heat generated by the reactions.

In some cases, a three-way catalyst is used in combination with a hydrocarbon-adsorbing material such as zeolite as described in JP-A 11-210451. In such a case where the hydrocarbon-adsorbing material is used, it is possible to allow HC to adsorb on the hydrocarbon-adsorbing material when the temperature of the catalyst is low, for example, when starting an engine; and to allow HC to desorb from the hydrocarbon-adsorbing material when the temperature of the catalyst is increased, so as to oxidize the desorbed HC by the catalysis of the precious metal. Therefore, using a hydrocarbon-adsorbing material is expected to decrease HC emission.

However, the present inventors have found in the course of achieving the present invention that an automotive vehicle having such a three-way catalyst is susceptible to improvement in terms of HC emission.

BRIEF SUMMARY OF THE INVENTION

An object of the present invention is to make it possible to decrease HC emission.

According to an aspect of the present invention, there is provided an exhaust gas purifying catalyst comprising a substrate, a hydrocarbon-adsorbing layer covering the substrate, and a catalytic layer covering the hydrocarbon-adsorbing layer, wherein the catalytic layer includes a layered structure of a first catalytic layer including a precious metal and a carrier supporting it, and a second catalytic layer including the same precious metal as the above precious metal and a carrier supporting it, a concentration of the precious metal in the second catalytic layer being higher than that in the first catalytic layer.

BRIEF DESCRIPTION OF THE SEVERAL VIEWS OF THE DRAWING

FIG. 3 is a cross-sectional view schematically showing another example of structure that can be employed in the exhaust gas-purifying catalyst shown in FIG. 1; and FIG. 4 is a cross-sectional view schematically showing another example of structure that can be employed in the exhaust gas-purifying catalyst shown in FIG. 1.

DETAILED DESCRIPTION OF THE INVENTION

An embodiment of the present invention will be described below.

Figure 1:
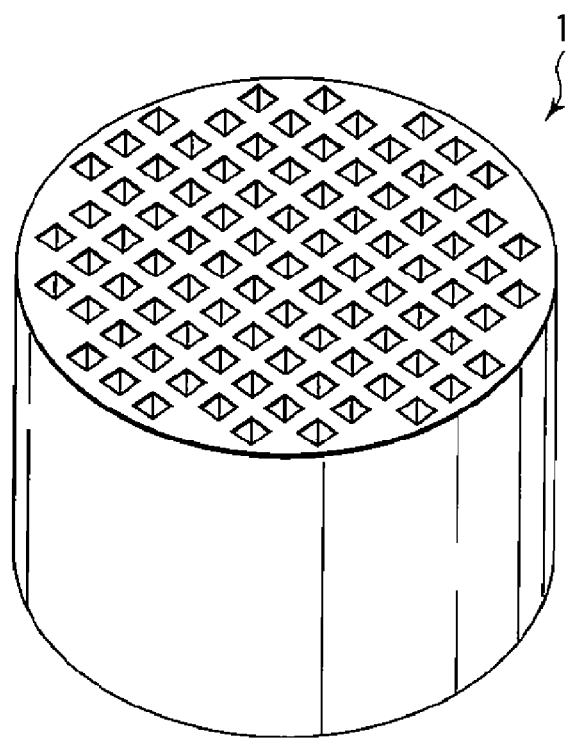
FIG. 1 is a perspective view schematically showing an exhaust gas-purifying catalyst according to an embodiment of the present invention.
Figure 2:
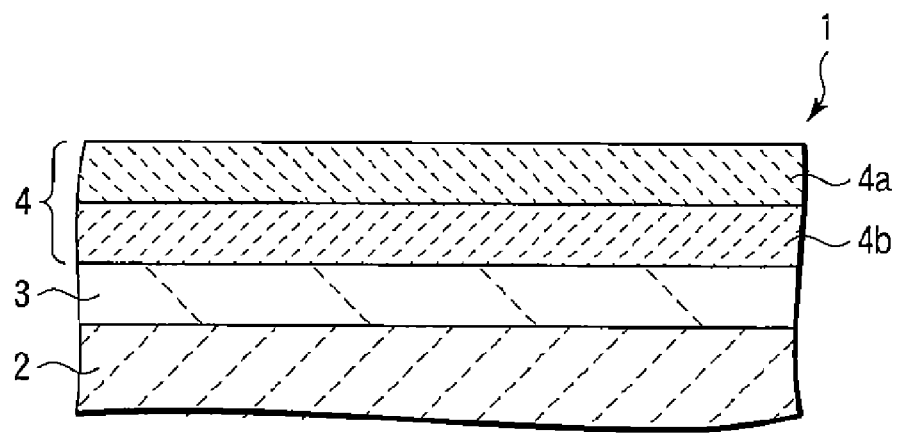
FIG. 2 is a cross-sectional view schematically showing an example of structure that can be employed in the exhaust gas-purifying catalyst shown in FIG. 1.

FIG. 1 is a perspective view schematically showing an exhaust gas-purifying catalyst according to an embodiment of the present invention. FIG. 2 is a cross-sectional view schematically showing an example of structure that can be employed in the exhaust gas-purifying catalyst shown in FIG. 1.

The exhaust gas-purifying catalyst 1 shown in FIGS. 1 and 2 is a monolith catalyst. The exhaust gas-purifying catalyst 1 includes a substrate 2 such as monolith honeycomb substrate. Typically, the substrate 2 is made of ceramics such as cordierite.

On the wall of the support substrate 2, a hydrocarbon-adsorbing layer 3 is formed. The hydrocarbon-adsorbing layer 3 includes a hydrocarbon-adsorbing material such as zeolite. The hydrocarbon-adsorbing layer 3 may further include other materials in addition to the hydrocarbon-adsorbing material. For example, it may further include the refractory carrier and/or oxygen storage material to be described later.

On the hydrocarbon-adsorbing layer 3, a catalytic layer 4 is formed. The catalytic layer 3 includes a layered structure of a first catalytic layer 4a and a second catalytic layer 4b. In the example shown in FIG. 2, the catalytic layer 4 is constituted by the first catalytic layer 4a and the second catalytic layer 4b, and the second catalytic layer 4b is interposed between the hydrogen-adsorbing layer 3 and the first catalytic layer 4a.

The first catalytic layer 4a includes a carrier and a precious metal supported thereby.

The carrier included in the first catalytic layer 4a is refractory carrier and/or oxygen storage material.

The refractory carrier is excellent in heat stability as compared with the oxygen storage material. As the material of the refractory carrier, alumina, zirconia or titania can be used, for example.

The oxygen storage material is, for example, ceria, composite oxide and/or solid solution of ceria and another metal oxide, or a mixture thereof. As the composite oxide and/or solid solution, composite oxide and/or solid solution of ceria and zirconia can be used, for example.

The precious metal included in the first catalytic layer 4a is, for example, an element of platinum group such as platinum, rhodium and palladium. Here, as an example, it is supposed that the first catalytic layer 4a includes at least rhodium and palladium. The concentration of palladium in the first catalytic layer 4a falls within a range of 0.2% by mass to 10% by mass, for example. The concentration of rhodium in the first catalytic layer 4a falls within a range of 0.2% by mass to 10% by mass, for example.

The thickness of the first catalytic layer 4a is set within a range of 10 μm to 100 μm, for example.

The second catalytic layer 4b includes a carrier and a precious metal supported thereby.

The carrier included in the second catalytic layer 4b is refractory carrier and/or oxygen storage material As the refractory carrier and/or oxygen storage material, the materials mentioned for the first catalytic layer 4a can be used, for example. The carrier included in the first catalytic layer 4a and carrier included in the second catalytic layer 4b may be the same or different from each other.

The precious metal included in the second catalytic layer 4b is, for example, an element of platinum group such as platinum, rhodium and palladium. Here, as an example, it is supposed that the second catalytic layer 4b includes at least palladium. The concentration of palladium in the second catalytic layer 4b falls within a range of 0.2% by mass to 30% by mass, for example.

The second catalytic layer 4b includes the same precious material as that included in the first catalytic layer 4a. The concentration of the precious metal in the second catalytic layer 4b is higher than that in the first catalytic layer 4a. In this example, the first catalytic layer 4a and the second catalytic layer 4b include palladium. The concentration of palladium in the second catalytic layer 4b is higher than that in the first catalytic layer 4a. For example, a ratio of the concentration of the palladium in the second catalytic layer 4b with respect to the concentration of the palladium in the first catalytic layer 4a falls within a range of 1 to 50, for example.

Note that the concentration of the precious metal other than palladium may be higher in either of the first catalytic layer 4a and the second catalytic layer 4b. Alternatively, they may have equal concentrations of the precious metal other than palladium.

The mass ratio of palladium included in the second catalytic layer 4b with respect to palladium included in the catalytic layer 4 is set, for example, within a range of 30% by mass to 95% by mass.

The thickness of the second catalytic layer 4b is set, for example, within a range of 5 μm to 50 μm.

The ratio of the thickness of the second catalytic layer 4b with respect to the thickness of the catalytic layer 4 is set, for example, within a range of 5% to 40%.

The catalytic layer 4 can further include an oxide of alkaline-earth metal such as barium; an oxide of rare-earth element such as lanthanum, neodymium, praseodymium and yttrium; or a mixture thereof. The oxides together with other oxides such as ceria may form composite oxide and/or solid solution. The oxides may be included in either or both of the first catalytic layer 4a and the second catalytic layer 4b.

A layer including the above-described refractory carrier and the oxygen storage material may be interposed between the hydrocarbon-adsorbing layer 3 and the catalytic layer 4.

In the exhaust gas-purifying catalyst 1, the composition of the first catalytic layer 4a is normally determined such that the reduction of $NO_x$ contained in the exhaust gas and the oxidations of CO and HC contained in the exhaust gas are optimized. However, such a composition is not optimum for oxidation of HC desorbed from the hydrocarbon-adsorbing layer 3. To be more specific, the concentration of palladium in the first catalytic layer 4a is too low for oxidation of HC desorbed from the hydrocarbon-adsorbing layer 3. Thus, in the case where the second catalytic layer 4b is omitted from the exhaust gas-purifying catalyst 1, most of HC desorbed from the hydrocarbon-adsorbing layer 3 is released into the atmosphere without being oxidized.

As described above, in the exhaust gas-purifying catalyst 1, the layered structure of the first catalytic layer 4a, which includes palladium at a lower concentration and further includes rhodium, and the second catalytic layer 4b, which includes palladium at a higher concentration, is disposed on the hydrocarbon-adsorbing layer 3. The second catalytic layer 4b can oxidize HC desorbed from the hydrocarbon-adsorbing layer 3 at a higher efficiency as compared with the first catalytic layer 4a. Therefore, when the exhaust gas-purifying catalyst 1 is used, HC emission can be decreased.

Various modifications can be made to the exhaust gas-purifying catalyst 1.

FIGS. 3 and 4 are cross-sectional views schematically showing other examples of structure that can be employed in the exhaust gas-purifying catalyst shown in FIG. 1.

The exhaust gas-purifying catalyst 1 shown in FIG. 3 has the same structure as that of the exhaust gas-purifying catalyst 1 shown in FIG. 2 except that the first catalytic layer 4a is interposed between the hydrocarbon-adsorbing layer 3 and the second catalytic layer 4b. Like this, the stacking order of the first catalytic layer 4a and the second catalytic layer 4b can be freely determined.

The exhaust gas-purifying catalyst 1 shown in FIG. 4 has the same structure as that of the exhaust gas-purifying catalyst 1 shown in FIG. 2 except that the catalytic layer 4 is constituted by two first catalytic layers 4a and the second catalytic layer 4b interposed therebetween. Like this, the catalytic layer 4 may includes a plurality of first catalytic layers 4a. Similarly, the catalytic layer 4 may includes a plurality of second catalytic layers 4b.

Examples of the present invention will be described below.

<Manufacture of Catalyst A>

In this example, the exhaust gas-purifying catalyst 1 shown in FIG. 2 was manufactured by the following method.

100 g of zeolite and 100 mL of deionized water are mixed together to prepare slurry. Hereinafter, the slurry is referred to as slurry S1.

Then, a monolith honeycomb substrate 2 made of cordierite was coated with whole of the slurry S1. Here, as the monolith honeycomb substrate, used was the one that has a volumetric capacity of 1.0 L and was provided with 900 cells per square inch. The monolith honeycomb substrate 2 was dried at 250° C. for 1 hour, and subsequently, fired at 500° C. for 1 hour. Thus, the hydrocarbon-adsorbing layer 3 was formed on the monolith honeycomb substrate 2.

Next, 10 g of alumina powder, 10 g of cerium-zirconium composite oxide powder, aqueous palladium nitrate containing 0.25 g of palladium, and aqueous rhodium nitrate containing 0.25 g of rhodium were mixed together to prepare slurry. Hereinafter, the slurry is referred to as slurry S2.

Then, the above monolith honeycomb substrate 2 was coated with whole of the slurry S2. The monolith honeycomb substrate 2 was dried at 250° C. for 1 hour, and subsequently, fired at 500° C. for 1 hour. Thus, the second catalytic layer 4b was formed on the monolith honeycomb substrate 2.

Thereafter, 40 g of alumina powder, 40 g of cerium-zirconium composite oxide powder, aqueous palladium nitrate containing 0.25 g of palladium, and aqueous rhodium nitrate containing 0.25 g of rhodium were mixed together to prepare slurry. Hereinafter, the slurry is referred to as slurry S3.

Then, the above monolith honeycomb substrate 2 was coated with whole of the slurry S3. The monolith honeycomb substrate 2 was dried at 250° C. for 1 hour, and subsequently, fired at 500° C. for 1 hour. Thus, the first catalytic layer 4a was formed on the second catalytic layer 4b.

The exhaust gas-purifying catalyst 1 shown in FIG. 2 was thus completed. Hereinafter, the exhaust gas-purifying catalyst 1 is referred to as catalyst A.

<Manufacture of Catalyst B>

In this example, the exhaust gas-purifying catalyst 1 shown in FIG. 3 was manufactured by the following method.

That is, in this example, the exhaust gas-purifying catalyst 1 shown in FIG. 3 was manufactured by the same method as that described for the catalyst A except that the slurry S3 was used instead of the slurry S2 and the slurry S2 was used instead of the slurry S3. Hereinafter, the exhaust gas-purifying catalyst 1 is referred to as catalyst B.

<Manufacture of Catalyst C>

In this example, the exhaust gas-purifying catalyst 1 shown in FIG. 4 was manufactured by the following method.

The hydrocarbon-adsorbing layer 3 was formed on the monolith honeycomb substrate 2 by the same method as that described for the catalyst A.

Then, the above monolith honeycomb substrate 2 was coated with half the slurry S3. The monolith honeycomb substrate 2 was dried at 250° C. for 1 hour, and subsequently, fired at 500° C. for 1 hour. Thus, the first catalytic layer 4a was formed on the hydrocarbon-adsorbing layer 3.

Thereafter, the above monolith honeycomb substrate 2 was coated with whole the slurry S2. The monolith honeycomb substrate 2 was dried at 250° C. for 1 hour, and subsequently, tired at 500° C. for 1 hour. Thus, the second catalytic layer 4b was formed on the first catalytic layer 4a.

Further, the above monolith honeycomb substrate 2 was coated with half the slurry S3. The monolith honeycomb substrate 2 was dried at 250° C. for 1 hour, and subsequently, fired at 500° C. for 1 hour. Thus, the first catalytic layer 4a was formed on the second catalytic layer 4b.

The exhaust gas-purifying catalyst 1 shown in FIG. 4 was thus completed. Hereinafter, the exhaust gas-purifying catalyst 1 is referred to as catalyst C.

<Manufacture of Catalyst D>

In this example, the exhaust gas-purifying catalyst 1 shown in FIG. 2 was manufactured by the following method.

The hydrocarbon-adsorbing layer 3 was formed on the monolith honeycomb substrate 2 by the same method as that described for the catalyst A.

Next, 2.5 g of alumina powder, 2.5 g of cerium-zirconium composite oxide powder, aqueous palladium nitrate containing 0.25 g of palladium, and aqueous rhodium nitrate containing 0.25 g of rhodium were mixed together to prepare slurry. Hereinafter, the slurry is referred to as slurry S4.

Then, the above monolith honeycomb substrate 2 was coated with whole the slurry S4. The monolith honeycomb substrate 2 was dried at 250° C. for 1 hour, and subsequently, fired at 500° C. for 1 hour. Thus, the second catalytic layer 4b was formed on the hydrocarbon-adsorbing layer 3.

Thereafter, 47.5 g of alumina powder, 47.5 g of cerium-zirconium composite oxide powder, aqueous palladium nitrate containing 0.25 g of palladium, and aqueous rhodium nitrate containing 0.25 g of rhodium were mixed together to prepare slurry. Hereinafter, the slurry is referred to as slurry S5.

Then, the above monolith honeycomb substrate 2 was coated with whole the slurry S5. The monolith honeycomb substrate 2 was dried at 250° C. for 1 hour, and subsequently, fired at 500° C. for 1 hour. Thus, the first catalytic layer 4a was formed on the second catalytic layer 4b.

The exhaust gas-purifying catalyst 1 shown in FIG. 2 was thus completed. Hereinafter, the exhaust gas-purifying catalyst 1 is referred to as catalyst D.

<Manufacture of Catalyst E>

In this example, the exhaust gas-purifying catalyst 1 shown in FIG. 2 was manufactured by the following method.

The hydrocarbon-adsorbing layer 3 was formed on the monolith honeycomb substrate 2 by the same method as that described for the catalyst A.

Next, 20 g of alumina powder, 20 g of cerium-zirconium composite oxide powder, aqueous palladium nitrate containing 0.25 g of palladium, and aqueous rhodium nitrate containing 0.25 g of rhodium were mixed together to prepare slurry. Hereinafter, the slurry is referred to as slurry S6.

Then, the above monolith honeycomb substrate 2 was coated with whole the slurry S6. The monolith honeycomb substrate 2 was dried at 250° C. for 1 hour, and subsequently, fired at 500° C. for 1 hour. Thus, the second catalytic layer 4b was formed on the hydrocarbon-adsorbing layer 3.

Thereafter, 60 g of alumina powder, 60 g of cerium-zirconium composite oxide powder, aqueous palladium nitrate containing 0.25 g of palladium, and aqueous rhodium nitrate containing 0.25 g of rhodium were mixed together to prepare slurry. Hereinafter, the slurry is referred to as slurry S7.

Then, the above monolith honeycomb substrate 2 was coated with whole the slurry S7. The monolith honeycomb substrate 2 was dried at 250° C. for 1 hour, and subsequently, fired at 500° C. for 1 hour. Thus, the first catalytic layer 4a was formed on the second catalytic layer 4b.

The exhaust gas-purifying catalyst 1 shown in FIG. 2 was thus completed. Hereinafter, the exhaust gas-purifying catalyst 1 is referred to as catalyst E.

<Manufacture of Catalyst F>

In this example, the exhaust gas-purifying catalyst 1 shown in FIG. 2 was manufactured by the following method.

The hydrocarbon-adsorbing layer 3 was formed on the monolith honeycomb substrate 2 by the same method as that described for the catalyst A.

Next, 10 g of alumina powder, 10 g of cerium-zirconium composite oxide powder, aqueous palladium nitrate containing 0.15 g of palladium, and aqueous rhodium nitrate containing 0.15 g of rhodium were mixed together to prepare slurry Hereinafter, the slurry is referred to as slurry S8.

Then, the above monolith honeycomb substrate 2 was coated with whole the slurry S8. The monolith honeycomb substrate 2 was dried at 250° C. for 1 hour, and subsequently, fired at 500° C. for 1 hour. Thus, the second catalytic layer 4b was formed on the hydrocarbon-adsorbing layer 3.

Thereafter, 40 g of alumina powder, 40 g of cerium-zirconium composite oxide powder, aqueous palladium nitrate containing 0.35 g of palladium, and aqueous rhodium nitrate containing 0.35 g of rhodium were mixed together to prepare slurry. Hereinafter, the slurry is referred to as slurry S9.

Then, the above monolith honeycomb substrate 2 was coated with whole the slurry S9. The monolith honeycomb substrate 2 was dried at 250° C. for 1 hour, and subsequently, fired at 500° C. for 1 hour. Thus, the first catalytic layer 4a was formed on the second catalytic layer 4b.

The exhaust gas-purifying catalyst 1 shown in FIG. 2 was thus completed. Hereinafter, the exhaust gas-purifying catalyst 1 is referred to as catalyst F.

<Manufacture of Catalyst G>

In this example, the exhaust gas-purifying catalyst 1 shown in FIG. 2 was manufactured by the following method.

The hydrocarbon-adsorbing layer 3 was formed on the monolith honeycomb substrate 2 by the same method as that described for the catalyst A.

Next, 10 g of alumina powder, 10 g of cerium-zirconium composite oxide powder, aqueous palladium nitrate containing 0.475 g of palladium, and aqueous rhodium nitrate containing 0.475 g of rhodium were mixed together to prepare slurry. Hereinafter, the slurry is referred to as slurry S10.

Then, the above monolith honeycomb substrate 2 was coated with whole the slurry S10. The monolith honeycomb substrate 2 was dried at 250° C. for 1 hour, and subsequently, fired at 500° C. for 1 hour. Thus, the second catalytic layer 4b was formed on the hydrocarbon-adsorbing layer 3.

Thereafter, 40 g of alumina powder, 40 g of cerium-zirconium composite oxide powder, aqueous palladium nitrate containing 0.025 g of palladium, and aqueous rhodium nitrate containing 0.025 g of rhodium were mixed together to prepare slurry. Hereinafter, the slurry is referred to as slurry S11.

Then, the above monolith honeycomb substrate 2 was coated with whole the slurry S11. The monolith honeycomb substrate 2 was dried at 250° C. for 1 hour, and subsequently, fired at 500° C. for 1 hour. Thus, the first catalytic layer 4a was formed on the second catalytic layer 4b.

The exhaust gas-purifying catalyst 1 shown in FIG. 2 was thus completed. Hereinafter, the exhaust gas-purifying catalyst 1 is referred to as catalyst G.

<Manufacture of Catalyst H>

In this example, an exhaust gas-purifying catalyst was manufactured by the following method.

A hydrocarbon-adsorbing layer was formed on a monolith honeycomb substrate by the same method as that described for the catalyst A.

Next, 50 g of alumina powder, 50 g of cerium-zirconium composite oxide powder, aqueous palladium nitrate containing 0.5 g of palladium, and aqueous rhodium nitrate containing 0.5 g of rhodium were mixed together to prepare slurry. Hereinafter, the slurry is referred to as slurry S12.

Then, the above monolith honeycomb substrate was coated with whole the slurry S10. The monolith honeycomb substrate was dried at 250° C. for 1 hour, and subsequently, fired at 500° C. for 1 hour. Thus, a catalytic layer was formed on the hydrocarbon-adsorbing layer.

An exhaust gas-purifying catalyst was thus completed. Hereinafter, the exhaust gas-purifying catalyst is referred to as catalyst H.

<Tests>

Each of the catalysts A to H was mounted on an automobile having an engine with a piston displacement of 2.0 L. Then, each automobile was driven to 80,000 km of endurance travel distance. Thereafter, emission per test was determined for each of total hydrocarbon (THC), CO and $NO_x$ by 11-mode method Note that the emission of THC is a value in gram obtained by converting a value represented in volumetric ratio based on equivalent carbon number.

TABLE 1

| Catalyst | THC (g/test) | CO (g/test) | $NO_X$ (g/test) |
|---|---|---|---|
| A | 0.61 | 5.20 | 0.50 |
| B | 0.62 | 5.18 | 0.51 |
| C | 0.59 | 5.22 | 0.49 |
| D | 0.57 | 5.25 | 0.53 |
| E | 0.63 | 5.19 | 0.49 |
| F | 0.60 | 5.21 | 0.51 |
| G | 0.61 | 5.19 | 0.52 |
| H | 0.85 | 5.30 | 0.55 |

As shown in the above table, in the case where the catalysts A to G were used, each emission of THC, CO and $NO_x$ was low as compared with the case where the catalyst H was used. Particularly, in the case where the catalysts A to G were used, THC emission was significantly decreased as compared with the case where the catalyst H was used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An exhaust gas-purifying catalyst comprising:
    a substrate;
    a hydrocarbon-adsorbing layer covering the substrate; and
    a catalytic layer covering the hydrocarbon-adsorbing layer, wherein the catalytic layer includes a layered structure of a first catalytic layer including a precious metal and a carrier supporting it, and a second catalytic layer including the same precious metal as the above precious metal and a carrier supporting it, a concentration of the precious metal in the second catalytic layer being higher than that in the first catalytic layer, wherein each of the first and second catalytic layers includes palladium, a concentration of palladium in the second catalytic layer being higher than that in the first catalytic layer, and wherein each of the first and second catalytic layers further includes rhodium, a concentration of rhodium in the second catalytic layer being higher than that in the first catalytic layer.

2. The exhaust gas-purifying catalyst according to claim 1, wherein each of the first and second catalytic layers further includes an oxygen storage material.

3. The exhaust gas-purifying catalyst according to claim 1, wherein the second catalytic layer is interposed between the substrate and the first catalytic layer.

4. The exhaust gas-purifying catalyst according to claim 1, wherein the first catalytic layer is interposed between the substrate and the second catalytic layer.

5. The exhaust gas-purifying catalyst according to claim 1, wherein catalytic layer includes a plurality of the first catalytic layers, and the second catalytic layer is interposed between two of the first catalytic layers.

6. The exhaust gas-purifying catalyst according to claim 1, wherein a ratio of the concentration of the precious metal in the second catalytic layer with respect to the concentration of the precious metal in the first catalytic layer falls within a range of 1.7 to 50.

7. An exhaust gas-purifying catalyst comprising:
    a substrate;
    a hydrocarbon-adsorbing layer covering the substrate; and
    a catalytic layer covering the hydrocarbon-adsorbing layer, wherein the catalytic layer includes a layered structure of a first catalytic layer including a precious metal and a carrier supporting it, and a second catalytic layer including the same precious metal as the above precious metal and a carrier supporting it, a concentration of the precious metal in the second catalytic layer is higher than that in the first catalytic layer, and
    each of the first and second catalytic layers includes rhodium, a concentration of rhodium in the second catalytic layer being higher than that in the first catalytic layer.

8. The exhaust gas-purifying catalyst according to claim 7, wherein each of the first and second catalytic layers further includes an oxygen storage material.

9. The exhaust gas-purifying catalyst according to claim 7, wherein the second catalytic layer is interposed between the substrate and the first catalytic layer.

10. The exhaust gas-purifying catalyst according to claim 7, wherein the first catalytic layer is interposed between the substrate and the second catalytic layer.

11. The exhaust gas-purifying catalyst according to claim 7, wherein catalytic layer includes a plurality of the first catalytic layers, and the second catalytic layer is interposed between two of the first catalytic layers.

12. The exhaust gas-purifying catalyst according to claim 7, wherein a ratio of the concentration of the precious metal in the second catalytic layer with respect to the concentration of the precious metal in the first catalytic layer falls within a range of 1.7 to 50, and each of the first and second catalytic layers includes rhodium, wherein a ratio of the concentration of rhodium in the second catalytic layer with respect to the concentration of rhodium in the first catalytic layer falls within a range of 1.7 to 50.

13. An exhaust gas-purifying catalyst comprising:
a substrate;
a hydrocarbon-adsorbing layer covering the substrate; and
a catalytic layer covering the hydrocarbon-adsorbing layer, wherein the catalytic layer includes a layered structure of a first catalytic layer including a precious metal and a carrier supporting it, and a second catalytic layer including the same precious metal as the above precious metal and a carrier supporting it, a concentration of the precious metal in the second catalytic layer is higher than that in the first catalytic layer, each of the first and second catalytic layers includes palladium, a concentration of palladium in the second catalytic layer is higher than that in the first catalytic layer, and the first catalytic layer is interposed between the substrate and the second catalytic layer, wherein each of the first and second catalytic layers further includes rhodium, a concentration of rhodium in the second catalytic layer being higher than that in the first catalytic layer.

14. The exhaust gas-purifying catalyst according to claim 13, wherein each of the first and second catalytic layers further includes an oxygen storage material.

15. The exhaust gas-purifying catalyst according to claim 13, wherein the catalytic layer includes a plurality of the first catalytic layers, and the second catalytic layer is interposed between two of the first catalytic layers.

16. The exhaust gas-purifying catalyst according to claim 13, wherein a ratio of the concentration of the precious metal in the second catalytic layer with respect to the concentration of the precious metal in the first catalytic layer falls within a range of 1.7 to 50, each of the first and second catalytic layers includes palladium, wherein a ratio of a concentration of palladium in the second catalytic layer with respect to the concentration of the precious metal in the first catalytic layer falls within a range of 1.7 to 50, and the first catalytic layer is interposed between the substrate and the second catalytic layer.

17. The exhaust gas-purifying catalyst according to claim 13, wherein a ratio of the concentration of rhodium in the second catalytic layer with respect to the concentration of rhodium in the first catalytic layer falls within a range of 1.7 to 50.

* * * * *